United States Patent [19]

Bor et al.

[11] Patent Number: 4,479,220
[45] Date of Patent: Oct. 23, 1984

[54] METHOD AND APPARATUS FOR GENERATING ULTRA-SHORT INDIVIDUAL LASER PULSES

[75] Inventors: Zsolt Bor; Fritz P. Schäfer, both of Goettingen, Fed. Rep. of Germany

[73] Assignee: Max-Planck-Gesellschaft Zur Foerderung Der Wissenschaften e.V., Goettingen, Fed. Rep. of Germany

[21] Appl. No.: 79,373

[22] Filed: Sep. 27, 1979

[51] Int. Cl.$^3$ ............................................. H01S 3/10
[52] U.S. Cl. ...................................... 372/25; 372/96; 372/53; 372/102; 372/10
[58] Field of Search ..................... 331/94.5 C, 94.5 Q, 331/94.5 M, 94.5 P; 350/162 R, 3.7, 7, 8; 372/96, 25, 26, 20, 18, 197, 108, 10, 53, 102

[56] References Cited

U.S. PATENT DOCUMENTS 3,675,157 7/1972 Kaminow et al. .................... 372/96
4,208,637 6/1980 Matsuda et al. ..................... 372/20

OTHER PUBLICATIONS

"Integrated Optics Devices Utilizing Thick Phase Gratings", by Kenan et al, *Optical Engineering*, vol. 15, No. 1, pp. 12-16, Jan.-Feb. 1976.
Tunable DFB Laser with Fan-Shaped Grating", by Matsuda et al, *Appl. Phys. Lett.*, vol. 31, No. 2, Jul. 15, 1977.

*Primary Examiner*—William L. Sikes
*Assistant Examiner*—Léon Scott, Jr.
*Attorney, Agent, or Firm*—Kinzer, Plyer, Dorn & McEachran

[57] ABSTRACT

Ultra-short individual laser pulses, having a half-amplitude duration of 100 picoseconds or less and a recurrence frequency of one Hz to one mHz are generated in a self Q-switching distributed feedback dye laser that employs a high density diffraction grating as a beam divider, dividing a primary beam from a pulsed pump laser into two excitation beams of +1 and −1 order; the excitation beams are directed, by two reversing mirrors, to impinge upon a focal line in a dye solution serving as an active laser medium. The pulses of the primary beam have a half-amplitude duration many times greater than 100 psec but no greater than 20 nsec, and the beam intensity is such that the stimulation of the dye does not exceed its laser threshold by more than 20%.

19 Claims, 2 Drawing Figures

METHOD AND APPARATUS FOR GENERATING ULTRA-SHORT INDIVIDUAL LASER PULSES

BACKGROUND OF THE INVENTION

Ultra-short laser beam pulses are required in a variety of scientific and engineering applications. The literature generally defines ultra-short laser beam pulses as pulses with a half-amplitude duration of less than about one hundred picoseconds. This definition shall apply in the present specification.

In most prior art methods for the generation of ultra-short laser pulses, long pulse trains are produced, each ultra-short pulse having a pulse width of a few nanoseconds or less, corresponding to the period of the laser resonator. However, a number of applications require radiation pulse trains in which the individual ultra-short pulses follow each other at relatively large intervals; typically, those intervals may correspond to a pulse sequence frequency of approximately one Hertz to 20 kHz. Such impulse trains, with pulse sequence frequencies of less than one mHz, especially below 100 kHz, are designated as consisting of "individual" ultra-short pulses. To obtain such individual ultra-short pulses from the above-mentioned impulse trains, from impulse sequence frequencies of about 100 mHz or less, using prior art techniques, expensive electro-optical or acoustical-optical devices have been required because the ultra-short individual pulses cannot be generated directly.

Actually, one known system can be employed to generate individual sub-nanosecond pulses, using a dye laser of appropriate wavelength pumped by short pulses from a nitrogen laser. However, this known method only permits the generation of laser pulses whose half-amplitude duration is far above 100 psec, even by going to the limit of the technical possibilities with respect to the shortening of the pulse width.

SUMMARY OF THE INVENTION

Consequently, it is an object of the present invention to generate individual ultra-short laser pulses in as simple, economical, and reliable a manner as possible.

Utilizing the advantageous improvements of the present invention, it is possible to adjust the wavelength of the ultra-short laser individual pulses in a simple manner. Thus, the method and apparatus of the invention can be used for a broad spectral range of output pulses, which may extend from the proximal ultraviolet through the visible to the proximal infrared.

Accordingly, in one aspect the invention relates to an improved pulse laser system for generating laser output pulses, comprising an excitation radiation source including a pump laser generating an at least partially coherent primary beam of radiation pulses each having a half-amplitude duration many times greater than one hundred psec and a pulse sequence frequency of not more than one mHz, beam divider means for dividing the primary beam into two generally coherent excitation beams, a stimulatable active laser medium, and means comprising two reversing mirrors for directing the two excitation beams onto the active laser medium to develop therein an interference pattern of predetermined spacing and hence a stimulation density distribution corresponding to that interference pattern. The improvement of the invention, which causes the system to generate ultra-short individual laser pulses each having a maximum half-amplitude duration of no more than one hundred psec at the pulse sequence frequency, comprises the beam divider being a high density diffraction grating, and the excitation radiation source supplying primary radiation pulses each having a half-amplitude duration no greater than twenty nsec and an intensity such that the stimulation of the laser medium exceeds its laser threshold by no more than twenty percent.

In another aspect, the invention relates to a method of generating a sequence of ultra-short individual laser output pulses having a half-amplitude pulse duration of no more than one hundred psec or less and a sequence frequency of not more than one mHz, comprising the steps of generating an at least partially coherent primary beam of radiation pulses recurring at the desired sequence frequency, projecting that beam along a given path, dividing the primary beam into two generally coherent excitation beams by means of a high density diffraction grating interposed in the path of the primary beam, the two excitation beams following paths essentially equiangularly divergent from the primary beam path, and directing the two excitation beams onto an active output laser medium, by means of two reversing mirrors, to stimulate the output laser medium by developing therein an interference pattern of predetermined spacing and hence a stimulation density distribution corresponding with that interference pattern, each primary beam pulse having a half-amplitude duration no greater than twenty nsec and an intensity such that the stimulation of the output laser medium exceeds its laser threshold by no more than twenty percent.

DESCRIPTION OF THE PREFERRED EMBODIMENTS

Figure 1:
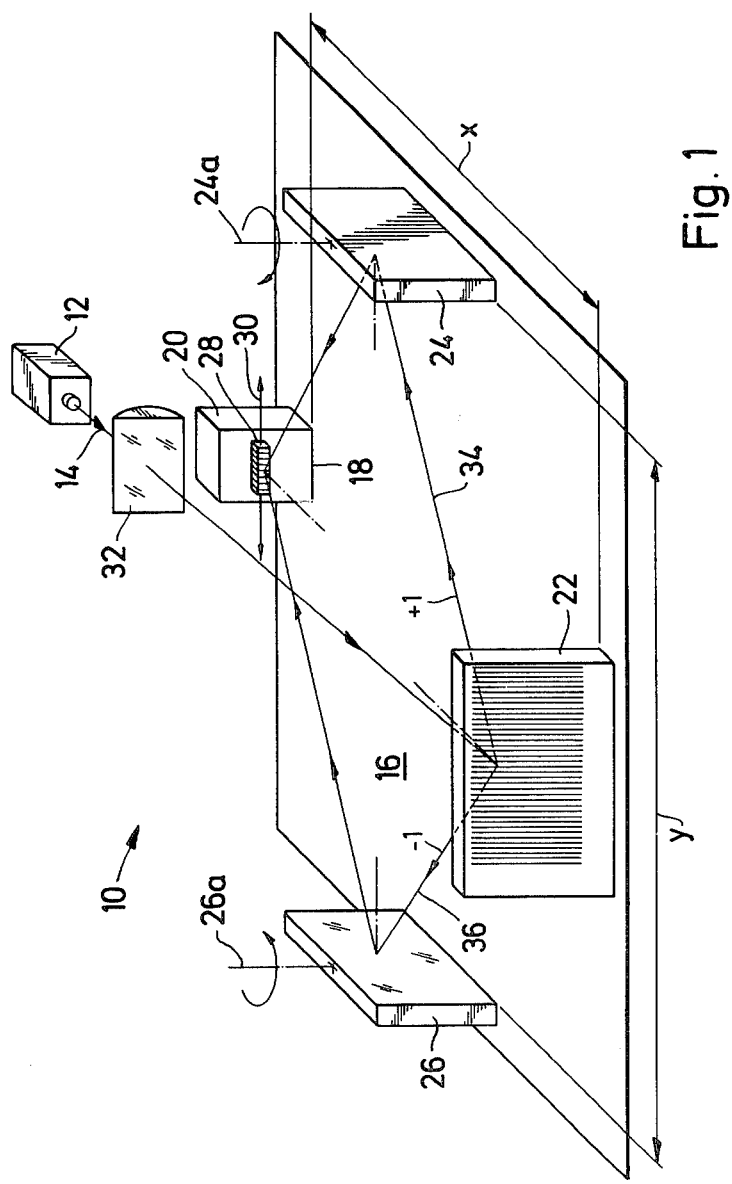
FIG. 1 is a simplified representation, in perspective, of one embodiment of the apparatus of the invention.

The present invention is based on a skillful utilization of properties of lasers not recognized until now, particularly of dye lasers with distributed feedback. Such lasers are known; see for example F. P. Schafer (Ed.): Dye Lasers. Topics in Applied Physics, Volume 1, Springer Publishers, Berlin-Heidelberg New York 1977, Volume 2. The prior art system for generating subnanosecond pulses, referred to above, is set forth in "Tunable Picosecond Pulse Laser Source Using Distributed Feedback Laser", Y. Aoyagi and S. Namba, *Optics Communication*, Vol. 23 pp. 330–332 (1977).

The method of the invention preferably and advantageously employs a DFB Laser (distributed feedback dye laser) in which two coherent beams of a stimulating excitation radiation, developed by a diffraction grating, are brought to interference in a stimulatable active laser medium, such as a dye solution in a dye cuvette. The two excitation beams produce an interference pattern in planes displaced from each other by a predetermined distance A, in which the radiation intensity has a maximum or a minimum. The laser medium, when stimulated in the planes of the interference maximum, emits a laser radiation beam, perpendicularly to the plane of the interference fringes, with a wavelength in vacuo of $$\lambda_o = 2 \, nA,$$

where n is the average index of refraction of the laser medium.

Investigation of the timing of the emitted laser pulses has resulted in the surprising discovery that individual ultra-short laser pulses can be transmitted from such a laser, particularly a dye laser with distributed feedback, under appropriate conditions as disclosed below. Two essential conditions are:

1. that the interference pattern be produced only during a few nanoseconds, and
2. that the intensity of the stimulating radiation pulse does not exceed a certain maximum value which is a function of the parameters of the laser.

The fact that under these conditions an ultra-short light pulse is generated can be explained as follows: As the stimulating exciting radiation pulse (pump laser pulse) increases in amplitude, an inversion is built up in the active laser medium (dye) which steadily increases, but only at the locations of interference maxima in the interference pattern. To the extent to which the diffraction grid-like inversion distribution builds up, the feedback for the stimulated emission also increases perpendicularly to the "grid surfaces". Thus, the stimulated emission does not grow linearly, but increases superproportionally, whereby a laser output pulse is created from the dye constituting the active laser medium. However, the rapidly growing laser pulse rapidly dissipates the stored inversion due to the stimulated emission so that the level of feedback for the stimulated emission quickly decreases. After the inversion has been broken up in this manner, in a very short laser pulse well below the threshold of the laser emission, it will take quite some time until the inversion again builds up above the laser threshold of the dye. When this occurs, another laser pulse output is developed. If the setup is such that the stimulating excitation radiation pulse (pump laser pulse) has a half-amplitude duration which in fact suffices to generate a first brief laser output pulse, but is not sufficient to attain the threshold level necessary for a subsequent pulse, an individual, a single very short laser output pulse is obtained for each stimulating excitation radiation pulse. The pump laser pulse should have a half-amplitude duration of twenty nsec or less, and the intensity of stimulation of the laser medium should not exceed its laser threshold by more than 20%, in order to obtain individual ultra-short output pulses. At higher pump power levels the number of output pulses increases; individual pulses are not realized.

The ultra-short pulse formation mechanism described above is generally similar to the formation of relaxation oscillations in a ruby laser or in a conventional dye laser with a short external cavity, by interaction between the excess population and number of photons in the cavity. But there is also an important difference. In the system of the present invention the equivalent cavity time is not constant, but has a large value during the rising half of each output pulse and has a low value during the decaying half. This change of equivalent cavity time during each pulse favours the formation and shortening of the output pulses. Therefore the short pulse formation mechanism described above can be designated as self Q-switching.

As a specific example, the stimulation of a dye laser with a pulse from a nitrogen pump laser having a half-amplitude duration of 5.5 nanoseconds produces an output pulse from the dye laser which surprisingly has a half-amplitude duration of only about 80 picoseconds down to about 35 picoseconds. That is, a remarkable narrowing of the pulse takes place, by a factor of one hundred or more as compared to the stimulating excitation pulse from the pump laser. It is worth mentioning that the described properties of a dye laser with distributed feedback also can be described by a mathematical model which operates with equations which in literature generally are designated as "rate equations" and that it may be deduced therefrom that with a further shortening of the excitation pulse it is possible to generate, by means of a dye laser with distributed feedback, a sequence of light pulses having half-amplitude durations below one picosecond.

The laser system 10 represented in simplified form in FIG. 1 was developed for the method described above, and offers a number of features from which surprising, novel, and advantageous properties of the invention result. The laser system 10 comprises an excitation impulse source 12, for example a pulsed-output nitrogen laser, which generates a primary excitation beam 14. Moreover, the embodiment represented in FIG. 1 includes a dye laser 16 operating with distributed feedback, comprising a cuvette 18 housing a stimulatable laser medium in the form of a dye solution 20, a diffraction grating 22 operating as a beam divider, and a reversing mirror arrangement including two mirrors 24 and 26; the latter may be dielectric mirrors. The diffraction grid 22 may be a holographic grating having a line density of 2442 grid lines per millimeter. The diffraction grid 22, which is used in place of the usual beam divider employing beam splitting mirrors or beam splitter cubes, generates two excitation beams 34 and 36 which correspond with the diffracted beams of the orders +1 and −1. The zero order beam is not represented in FIG. 1. The two excitation beams 34 and 36, preferably of approximately equal intensity, are directed, by the reversing mirrors 24 and 26, into the dye cuvette 18. The mirrors 24 and 26 are aligned substantially perpendicular to the plane of the diffraction grating 22 and approximately parallel with the grid lines of the grating. The beams 34 and 36 generate an interference pattern, as described above, in a stimulated volume 28 in the dye solution 20.

A cylindrical lens 32 is interposed in the path of the primary beam 14, between the excitation beam source 12 and the diffraction grating 22; the lens 32 is aligned so that the axis of the cylindrical lens surface extends perpendicular to the grid lines of the diffraction grating 22. The focal length of the cylinder lens 32 is selected to focus the primary beam 14, and thus the excitation beams 34 and 36 produced from it, upon a focal line in the interior of the laser medium 20.

The use of a diffraction grating, and particularly a holographic grating, as a beam divider, affords an important advantage in that the apparatus 16 is not restricted to use with a narrow-band excitation radiation source; instead, a laser which emits over a relatively wide frequency band, as for example the nitrogen laser 12, can be employed. If a wide-band laser were used with an ordinary beam divider, no clearly defined interference pattern would result because interference patterns of the different wavelengths in the excitation beams would become superposed and, on the whole, would produce a blurred pattern not effectively usable for the method of the invention. On the other hand, with a diffraction grid the differing wavelengths are diffracted into excitation radiation beams diverging equi-angularly from the grating and, with the proper choice of the distance y between the mirrors 24 and 26 and the distance x between the diffraction grating 22 and the laser medium 20, the divided beams 34 and 36 combine into an interference pattern with essentially 100% modulation depth. In the system 10, FIG. 1, the geometry is selected so that the fringe spacing A is independent of the wavelength of the excitation radiation and A=d/2, with d representing the line spacing of the diffraction grating 22.

In the selection of the parameters x and y, the geometrical relation $$\frac{x}{y} = \sqrt{\left(\frac{d}{\lambda_p}\right)^2 - 1},$$

in which $\lambda_p$ is the wavelength of the pump laser 12, is preferably maintained. For this relationship, at any given point of impingement on the dye 20 in the cuvette 18, the two interferring beams 34 and 36 are diffracted from the same point on the grating 22. This means that it is possible to attain effective "visibility" of the interference fringes, even when using a pump laser having low spatial coherence. If a mirror-type beam splitter were substituted for the grating 22, these properties could not be effectively realized.

With the use of an output laser medium capable of emitting in a certain frequency band, particularly with the use of a dye solution as the laser medium, different possibilities exist with respect to the setting and/or modification of the wavelength of the output beam 30 from the laser:

1. Modification of the modulation spacing A of the interference pattern according to the previously mentioned equation $\lambda_o = 2$ nA.

This can be accomplished by turning the reflectors through equal angles in opposite directions about their respective axes 24a and 26a, as indicated by arrows 24c and 26c. By using a $10^{-3}$ molar solution of rhodamine 6G in ethanol, turning the reflectors through an angle of one milliradian results in a change of wavelength of eight Angstroms.

2. Change of the modulation spacing A by modification of the distances x and y. A change of the wavelength by about 3 to 4 Å per millimeter of change results. The tuning range for this expedient, however, is limited to about ±1 Å.

3. Change of the index of refraction n of the dye solution used as the active laser medium, by using different solvents or mixtures of solvents.

4. Change of the refractive index n by modification of the temperature of the active laser medium (dye). For example, in a dye laser containing ethanol as the solvent, the wavelength changes by 1.7 Å for a temperature change of 1° C.

5. Change of the index of refraction n of the active laser medium by modification of the pressure. For example, the cuvette of the dye laser may be constructed as a variable pressure cuvette; by changing the pressure of a gas (nitrogen for example) on the dye solution, a change of the index of refraction of the solvent may be brought about, due to its compressibility. With a mixture consisting of 80% dimethyl sulfoxide and 20% ethanol as solvent, there is a change in the laser wavelength of 0.114 Å per bar of pressure change.

Figure 2:
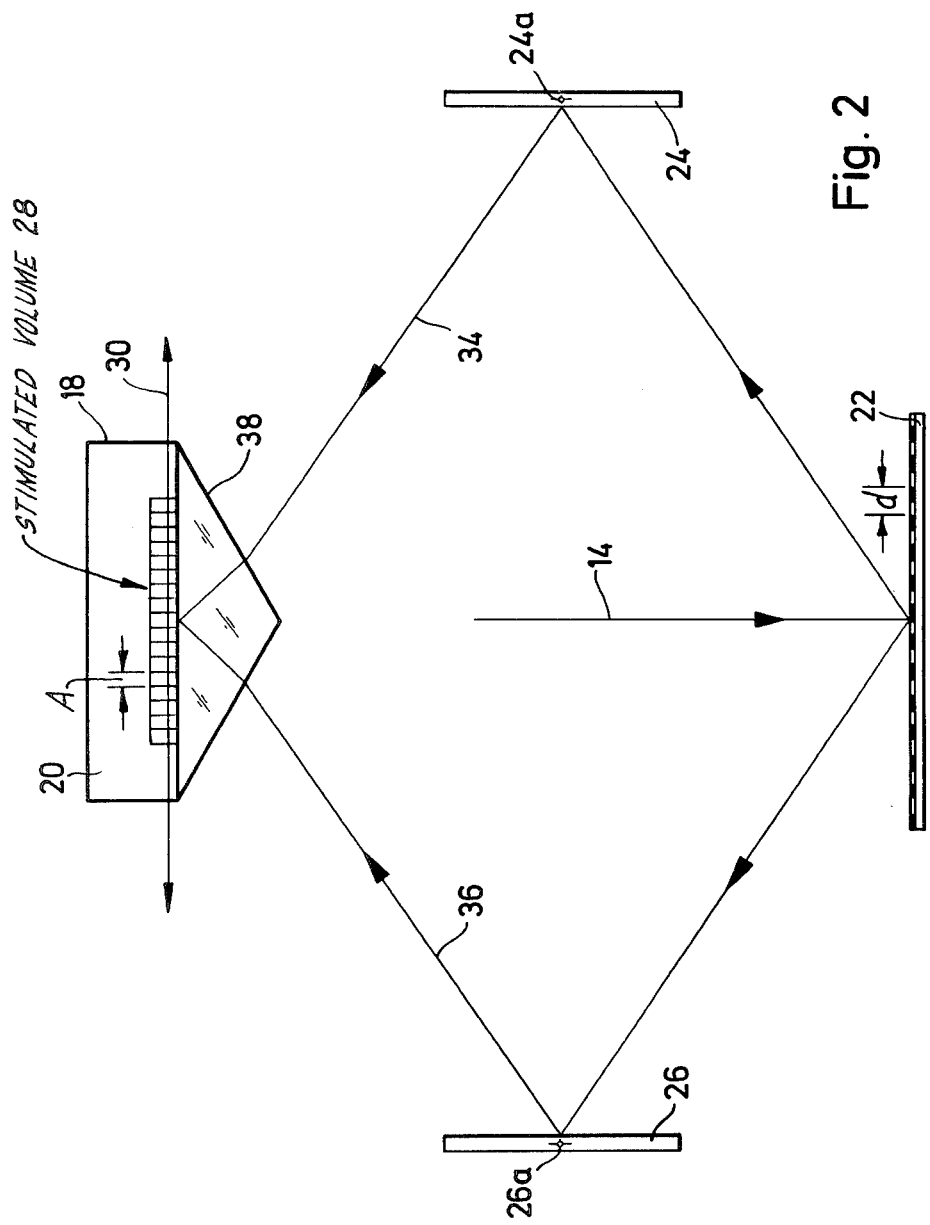
FIG. 2 is a schematic plan view of a second embodiment of the apparatus of the invention.

6. Change of the angle of incidence of the beams 34 and 36, which can be effected by a prism 38 positioned in the beam paths substantially symmetrically ahead of the active laser medium, the cuvette 18 containing the dye solution, as shown in FIG. 2. The prism 38 may be a hollow prism, loaded with different gases or with gases at different pressures, or loaded with liquids of different or varying indices of refraction.

Of course, the above described different measures for the variation and/or adjustment of the wavelength of the output beam 30 may be combined with each other, if this is desirable.

From the foregoing description, it will be apparent that the method and apparatus of the invention afford a laser system that is self Q-switching and that produces very narrow output pulses (down to 1 psec or even less) recurring at very low pulse sequence frequencies. This self Q-switched laser system has many advantages in comparison with conventional mode-locking systems:

1. The system is inexpensive and reliable, and requires no sophisticated optical or electronic components.
2. The method is applicable to virtually any dye operating at any wavelength, since the system does not use saturable absorbers.
3. It is possible to obtain single picosecond output pulses without pulse selectors. The pulse repetition rate is continuously variable and is determined by the repetition rate of the pumping laser.
4. With the optical arrangement described above virtually any pulsed pumping laser, including nitrogen, excimer, or copper vapor lasers, can be used.
5. It is easy to build an oscillator-amplifier system, since only a small fraction of the pumping laser power is needed to pump the DFB laser, and the peak power of the generated single pulses is high enough for amplification.
6. The DFB laser has superior spectral properties:
    (a) No longitudinal modes build up, so that tunability without mode hopping is very straightforward.
    (b) On the basis of photographs of the Fabry-Perot fringes, it appears that the linewidth of the DFB laser is less than twice its Fourier-transform limit.

The only apparent disadvantage of the method is that the beam divergence is about ten mrad, but that difficulty is readily improved by using an amplifier stage.

The distributed feedback dye lasers of the invention, pumped by the interference fringes produced by two diffraction-developed pumping beams, are gain coupled; moreover, the equivalent cavity decay time is proportional to the square of the gain. The latter leads to the self Q-switching effect which permits effective picosecond pulse generation. For ultra-short pulse generation, the self Q-switched distributed feedback dye laser has many advantages as an alternate to mode-locking lasers.

We claim:

1. In a pulse laser system for generating laser output pulses, of the kind comprising:
    an excitation radiation source including a pump laser generating an at least partially coherent primary beam of radiation pulses each having a half-amplitude duration many times greater than one hundred psec and a pulse sequence frequency of not more than one mHz;

beam divider means for dividing the primary beam into two generally coherent excitation beams;

a stimulatable active output laser medium; and means, comprising two reversing mirrors, for directing the two excitation beams onto the active output laser medium to develop therein an interference pattern of predetermined spacing and hence a stimulation density distribution corresponding to that interference pattern;

the improvement comprising:

the beam divider being a high density diffraction grating; and the excitation radiation source supplying primary radiation pulses each having a half-amplitude duration no greater than twenty nsec and an intensity such that the stimulation of the output laser medium exceeds its laser threshold by no more than twenty percent;

whereby the interference pattern is limited to intervals of a few nanoseconds and the system generates ultra-short individual output laser pulses each having a maximum half-amplitude duration of no more than one hundred psec at the pulse sequence frequency.

2. An improved laser pulse system according to claim 1 in which the system components are aligned in accordance with the relation $$\frac{x}{y} = \sqrt{\left(\frac{d}{\lambda_p}\right)^2 - 1} ,$$

in which:
x = distance between the beam divider and the active laser medium;
y = distance between the reversing mirrors;
d = line spacing of the diffraction grating; and
$\lambda_p$ = wavelength of the pump laser.

3. An improved pulse laser system according to claim 1 or claim 2 in which the active laser medium is a dye solution.

4. An improved pulse laser system according to claim 1 and further comprising:

lens means, interposed in the path of the primary beam, for focussing the primary beam so that the excitation beams impinge upon a focal line in the active laser medium.

5. An improved pulse laser system according to claim 4 in which the lens means comprises a cylindrical lens having its axis aligned perpendicular to the grid lines of the diffraction grating.

6. An improved pulse laser system according to claim 1 and further comprising a prism interposed in the paths of the excitation beams, between the reversing mirrors and the laser medium, in substantially symmetrical relation to the two excitation beams.

7. An improved pulse laser system according to claim 1 or claim 2, or claim 4 or claim 6, in which the active laser medium has a wide-band emission characteristic, and further comprising tuning means for adjusting the emission wavelength of the laser medium.

8. An improved laser system according to claim 7, in which the two reversing mirrors are aligned substantially symmetrically to each other in the respective paths of the two excitation beams, and are adjustable relative to each other by equi-angular rotation in opposite directions about axes approximately perpendicular to the excitation beam paths, whereby the mirrors comprise the tuning means.

9. The method of generating a sequence of ultra-short individual laser output pulses having a maximum half-amplitude pulse duration of no more than one hundred psec and a sequence frequency of not more than one mHz, comprising:

generating an at least partially coherent primary beam of radiation pulses, recurring at the desired sequence frequency, and projecting that primary beam along a given path;

dividing the primary beam into two generally coherent excitation beams by means of a high density diffraction grating interposed in the path of the primary beam, the two excitation beams following paths essentially equi-angularly divergent from the primary beam path; and directing the two excitation beams onto an active output laser medium, by means of two reversing mirrors, to stimulate the output laser medium by developing therein an interference pattern of predetermined spacing and hence a stimulation density distribution corresponding with that interference pattern;

each primary beam pulse having a half-amplitude duration no greater than twenty nsec and an intensity such that the stimulation of the output laser medium exceeds its laser threshold by no more than twenty percent.

10. The method of generating ultra-short individual laser pulses, according to claim 9, and further comprising:

focussing the primary beam on the diffraction grating in a manner such that the two excitation beams impinge upon a focal line in the laser medium.

11. The method of generating ultra-short individual laser pulses, according to claim 9 or claim 10, using an output laser medium having an emission characteristic encompassing a wide band of emission wavelengths, and further comprising:

adjusting the effective emission wavelength of the laser medium to obtain output pulses of given frequency.

12. The method of generating ultra-short individual laser pulses, according to claim 11, in which adjustment of the emission wavelength is effected by changing the index of refraction of the laser medium.

13. The method of generating ultra-short individual laser pulses, according to claim 11, in which adjustment of the emission wavelength is effected by equi-angular rotation of the reversing mirrors, in opposite directions, about axes approximately parallel to the lines of the diffraction grating.

14. The method of generating ultra-short individual laser pulses, according to claim 11, in which adjustment of the emission wavelength is effected by adjusting the spacing between the two reversing mirrors.

15. The method of generating ultra-short individual laser pulses, according to claim 11, in which adjustment of the emission wavelength is effected by adjusting the spacing between the diffraction grating and the laser medium.

16. The method of generating ultra-short individual laser pulses, according to claim 11, in which adjustment of the emission wavelength is effected by changing the composition of the laser medium.

17. The method of generating ultra-short individual laser pulses, according to claim 11, in which adjustment of the emission wavelength is effected by changing the temperature of the laser medium.

18. The method of generating ultra-short individual laser pulses, according to claim 11, in which the output laser medium is maintained under pressure and in which adjustment of the emission wavelength is effected by changing the pressure acting upon the laser medium.

19. The method of generating ultra-short individual laser pulses, according to claim 11, in which a hollow prism is interposed in the paths of the two excitation beams between the reversing mirrors and the laser medium, and in which adjustment of the emission wavelength is effected by changing a fluid medium filling the interior of the prism, utilizing media of different refractive indices.

* * * * *

UNITED STATES PATENT AND TRADEMARK OFFICE
CERTIFICATE OF CORRECTION

PATENT NO. : 4,479,220
DATED : Oct. 23, 1984
INVENTOR(S) : Zsolt Bor and Fritz P. Schafer It is certified that error appears in the above—identified patent and that said Letters Patent is hereby corrected as shown below:

Cover page, left-hand column, after item [22] insert:

--[30]  Foreign Application Priority Data
        Jan. 10, 1979 [DE] Fed. Rep. of Germany...2900728--

Signed and Sealed this

Eleventh Day of June 1985

[SEAL]

Attest:

DONALD J. QUIGG

Attesting Officer     Acting Commissioner of Patents and Trademarks